(12) United States Patent
Shimura

(10) Patent No.: US 8,587,837 B2
(45) Date of Patent: Nov. 19, 2013

(54) IMAGE PROCESSING APPARATUS EMBEDDING ADDITIONAL INFORMATION IN DOCUMENT DATA

(75) Inventor: Hiroshi Shimura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 245 days.

(21) Appl. No.: 13/170,542

(22) Filed: Jun. 28, 2011

(65) Prior Publication Data

US 2012/0002242 A1 Jan. 5, 2012

(30) Foreign Application Priority Data

Jun. 30, 2010 (JP) ................................ 2010-150080

(51) Int. Cl.
*H04N 1/40* (2006.01)
*G06K 9/00* (2006.01)
*H04L 9/32* (2006.01)

(52) U.S. Cl.
USPC ........................... 358/3.28; 382/100; 713/176

(58) Field of Classification Search
None
See application file for complete search history.

(56) References Cited

U.S. PATENT DOCUMENTS

| | | |
|---|---|---|
| 4,760,406 A | 7/1988 | Sato et al. |
| 2003/0118211 A1 | 6/2003 | Eguchi et al. |
| 2006/0075241 A1* | 4/2006 | Deguillaume et al. ........ 713/176 |
| 2008/0205699 A1 | 8/2008 | Kuraki et al. |
| 2009/0136082 A1* | 5/2009 | Zandifar et al. ............. 382/100 |
| 2009/0147292 A1 | 6/2009 | Shimura et al. |

FOREIGN PATENT DOCUMENTS

| | | |
|---|---|---|
| CN | 100 353 279 C | 12/2007 |
| EP | 1 835 718 A1 | 9/2007 |
| JP | 2006-237858 | 9/2006 |
| JP | 3833154 | 10/2006 |
| JP | 3848141 | 11/2006 |
| JP | 2008-172519 | 7/2008 |

OTHER PUBLICATIONS

The extended European search report dated Sep. 29, 2011.
Jack T Brassil et al: "Copyright Protection for the Electronic Distribution of Text Documents", Proceedings of the IEEE, IEEE. New York, US, vol. 87, No. 7, Jul. 1, 1999.
Mohammad Shirali-Shahreza et al: "Steganography in TeX documents", Intelligent System and Knowledge Engineering, 2008. pp. 1363-1366.
Shirali-Shahreza M H et al: "A New Approach to Persian/Arabic Text Steganography", Computer and Information Science, 2006. ICIS-COMSAR 2006. 5th IEEE/ACI S International Conference on Honolulu, HI, USA Jul. 10-12, 2006, pp. 310-315.

* cited by examiner

*Primary Examiner* — Barbara Reinier
(74) *Attorney, Agent, or Firm* — IPUSA, PLLC

(57) ABSTRACT

In an image processing apparatus, an input part inputs additional information to be embedded when printing a document. A developing part develops a character contained in the document, into which character the additional information is to be embedded, using a form deformed according to the additional information.

11 Claims, 9 Drawing Sheets

FIG.2

| FONT NAME | CHARACTER CODE | VECTOR | START POINT | CONTROL POINT #1 | CONTROL POINT #2 | END POINT |
|---|---|---|---|---|---|---|
| ⋮ | ⋮ | | | | | |
| xxx | ⋮ | | | | | 171 |
| | 33 | V1 | VC1-1 | VC1-2 | VC1-3 | VC1-4 |
| | | V2 | VC2-1 | VC2-2 | VC2-3 | VC2-4 |
| | | V2' | VC2'-1 | VC2'-2 | VC2'-3 | VC2'-4 |
| | | V3 | VC3-1 | VC3-2 | VC3-3 | VC3-4 |
| | | V3' | VC3'-1 | VC3'-2 | VC3'-3 | VC3'-4 |
| | | V4 | VC4-1 | VC4-2 | VC4-3 | VC4-4 |
| | 34 | v1 | vc1-1 | vc1-2 | vc1-3 | vc1-4 |
| | | v1' | vc1'-1 | vc1'-2 | vc1'-3 | vc1'-4 |
| | | v2 | vc2-1 | vc2-2 | vc2-3 | vc2-4 |
| | | v3 | vc3-1 | vc3-2 | vc3-3 | vc3-4 |
| | ⋮ | | | | | |
| | ⋮ | | | | | |

FIG.3

| FONT NAME | CHARACTER CODE | INFORMATION AMOUNT | CODE | USE VECTOR |
|---|---|---|---|---|
| ⋮ | ⋮ | | | |
| xxx | 33 | 2bit | 00 | V1→V2→V3→V4 |
| | | | 01 | V1→V2'→V3→V4 |
| | | | 10 | V1→V2→V3'→V4 |
| | | | 11 | V1→V2'→V3'→V4 |
| | 34 | 1bit | 0 | v1→v2→v3 |
| | | | 1 | V1'→v2→v3 |
| | ⋮ | | | |
| ⋮ | ⋮ | | | |

172

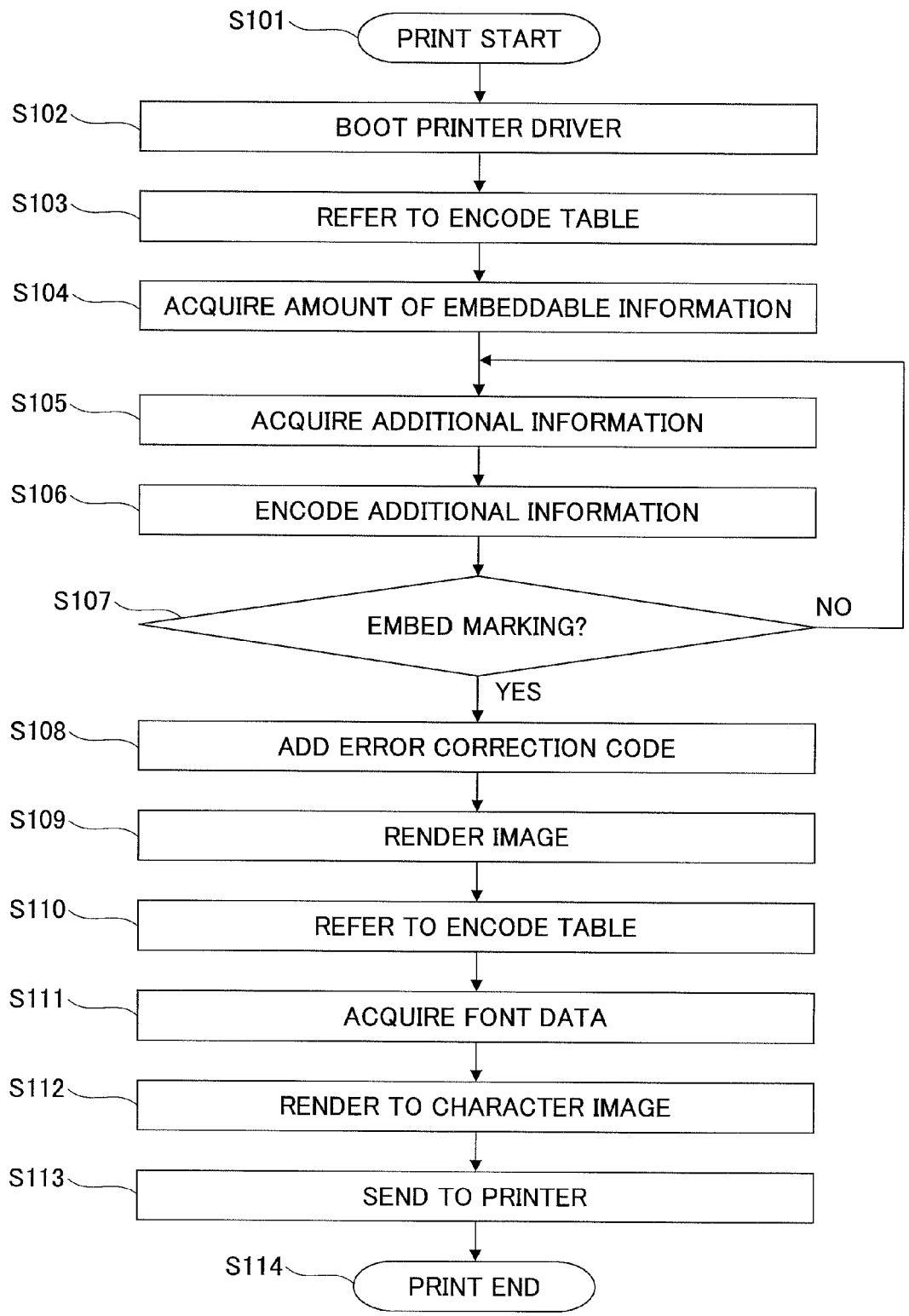

IMAGE PROCESSING APPARATUS EMBEDDING ADDITIONAL INFORMATION IN DOCUMENT DATA

BACKGROUND OF THE INVENTION

1. Field of the Invention

The present invention relates to an image processing technique to process image data to be printed out by a printer.

2. Description of the Related Art

There have been increasing social demands for documents, which require high security, to identify a leaking source when a leakage occurs. According to a method to identify a leakage source, a marking indicating identification such as information regarding a person who output a document may be given to the document. In order to satisfy such a demand, for example, Japanese Laid-Open Patent Application No. 2006-237858 suggests a marking technique to extract information embedded in a document when scanning the document, the information being embedded in the document when printing the document.

According to the marking technique, the information is embedded in the document by applying a certain process to the document image to be printed. There may be no problem if the document image is processed because a change in a document image caused by such a process to embed special information does not affect the contents of the document. However, the meaning of a document containing a drawing or the like may be changed if the drawing is changed to some extent. That is, when embedding information in a document containing a drawing or the like, it is necessary to maintain geometrical features of the drawing or the like.

There is suggested a conventional technique to apply a deformation process or an intensity process to an image after rendering. However, such a technique is not usable because the deformation of image may destroy a geometrical feature of a drawing or the like. Additionally, because a drawing or the like is expressed by a binary image in many cases, it may be difficult to embed information in the drawing by using intensity of the drawing.

Also, there is suggested a technique to embed information in a document by changing intervals of characters or lines contained in a drawing. However, if the characters themselves are a part of a total design, the total design is changed by the change in the intervals of characters or lines. Thus, this technique is not suitable. This technique also has an additional problem in that it takes a long time to perform the process of embedding information because there must be a process of extracting characters by analyzing the image of the drawing.

SUMMARY OF THE INVENTION

It is a general object of the present invention to provide a novel and useful image processing apparatus in which the above-mentioned problems are eliminated.

A more specific object of the present invention is to provide an image processing apparatus which can embed information when printing is performed without changing a geometrical feature of a drawing or the like contained in a document.

In order to achieve the above-mentioned objects, there is provided according to one aspect of the present invention an image processing apparatus, comprising: an input part configured to input additional information to be embedded when printing a document; and a developing part configured to develop a character contained in the document, into which character the additional information is to be embedded, using a form deformed according to the additional information.

There is provided according to another aspect of the invention an image processing method, comprising: inputting additional information to be embedded when printing a document; and developing a character contained in the document, into which character the additional information is to be embedded, using a form deformed according to the additional information.

Other objects, features and advantages of the present invention will become more apparent from the following detailed description when read in conjunction with the accompanying drawings.

BRIEF DESCRIPTION OF THE DRAWINGS

FIG. 2 is an illustration indicating a data structure of a font dictionary;

FIG. 3 is an illustration indicating a data structure of a encode table 172;

FIG. 6 is a flowchart of a process of printing a document including a process of embedding information in the document;

DETAILED DESCRIPTION OF THE PREFERRED EMBODIMENTS

A description will be given below, with reference to the drawings, of embodiments of the present invention.

According to an embodiment of the present invention, information is embedded in characters that are to be developed, such as a dimension of a drawing or a cautionary statement (not an image but characters expressed by character codes), and is not embedded in characters as a part of a design. If there is strict meaning in characters as a part of a design, it is considered that the characters are already treated as an image. Thus, information can be embedded without deformation of the characters as a design, by developing the characters as characters having different forms according to embedded information.

Additionally, in order to perform an information embedding process at a high speed, a plurality of character forms are retained previously as font data. Thereby, an amount of processing when embedding information is almost the same as that when information is not embedded.

Figure 1:
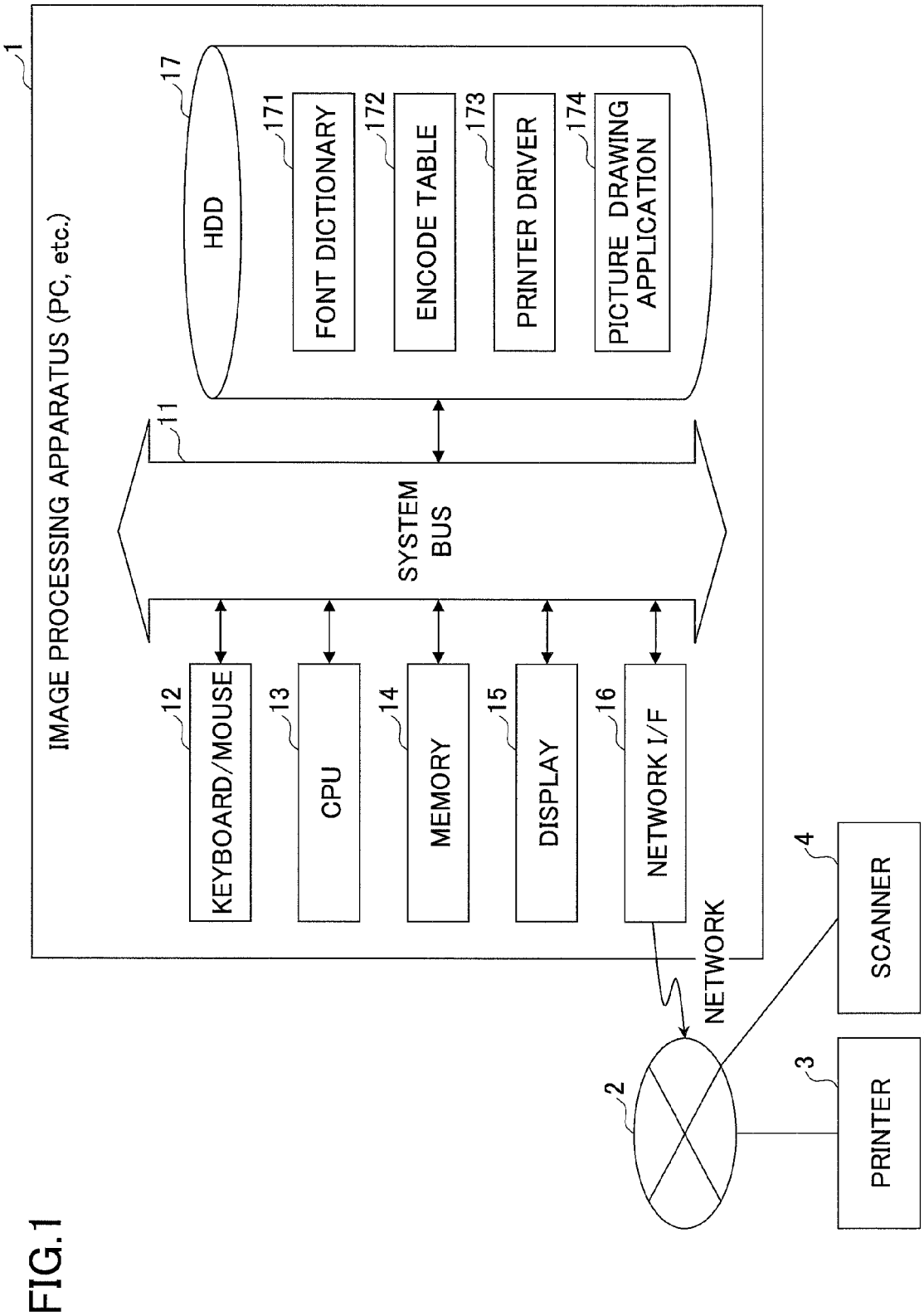
FIG. 1 is a block diagram of a system structure according an embodiment of the present invention.

FIG. 1 is a block diagram of a system structure according an embodiment of the present invention. In FIG. 1, an image processing apparatus such as a personal computer (PC) or the like is connected to a network 2 so that the image processing apparatus 1 is capable of printing and reading a document using a printer 3 and a scanner 4 that are also connected to the network 2.

The image processing apparatus 1 includes a keyboard/mouse 12, a central processing unit (CPU) 13, a memory 14, a display 15, a network interface (I/F) 16 and a hard disk drive (HDD) 17 that are connected to a system bus 11. The keyboard/mouse 12 is an input device (key input device, a printing device) that is configured to receive a user operation. The CPU 13 is a processing part to perform a control of an entire image processing apparatus 1. The memory 14 is a part serving as a work area for the CPU 13 to temporarily store programs and data. The display 15 is a display device configured to display information to a user. The network I/F 16 is a part to perform communication with the printer 3 and the scanner 4 through the network 2.

The HDD 17 is a part to permanently store programs and data. Specifically, the HDD 17 stores a font dictionary 171, an encode table 172, a printer driver 173 and a picture drawing application 174.

The font dictionary 171 retains font data used for printing and display. A data structure of the font dictionary 171 is mentioned later. The encode table 172 retains rules for embedding information into characters as an object contained in the document to be printed and to be when printing and an amount of information that can be embedded. A data structure of the encode table 171 is mentioned later. The printer driver 173 is a program for printing the document produced by an application by the printer 3. The printer driver 173 performs rendering on an image to be printed, and also performs a control of printing. The picture drawing application 174 is an application program for producing a document containing a picture or the like.

FIG. 2 is an illustration indicating a data structure of the font dictionary 171. The font dictionary 171 includes items such as "font name (font kind)", "character code", "vector", "start point", "control point #1", "control point #2", "terminal point", etc.

The "vector" is an identifier of a vector of a three-dimensional Bezier curve or the like that constitutes a contour of one character specified by the "font name" and the "character code". For the sake of convenience, a vector representing a curve passing through a center portion of the character is illustrated instead of the contour (outline) of the character. A correspondence between the vector and an actual character is mentioned later.

The "start point" indicates a coordinates of a drawing start position of each vector. The "control point #1" and "control point #2" indicate positional coordinates featuring a curve of each vector. The "end point" indicates coordinates of a drawing end position of each vector.

FIG. 3 is an illustration indicating a data structure of the encode table 172. The encode table 172 contains items such as "font name", "character code", "amount of information", "code", and a "use vector", etc.

The "amount of information" indicates an amount of information which can be embedded in one character specified by the "font name" and the "character code".

The "code" indicates contents of the information to be embedded. The "use vector" indicates vectors used for drawing characters in which the "code" concerned is embedded (a combination of vectors of the font dictionary 171 of FIG. 2).

Figure 4A:
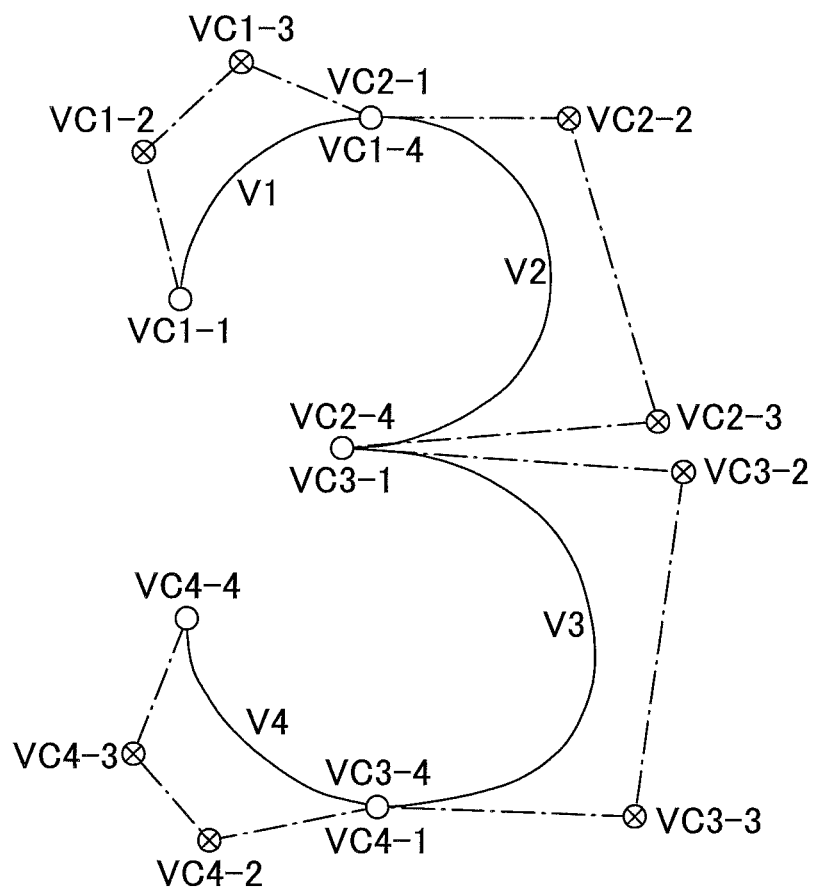
FIGS. 4A and 4B are illustrations of an example of vectors constituting an outline font.
Figure 4B:
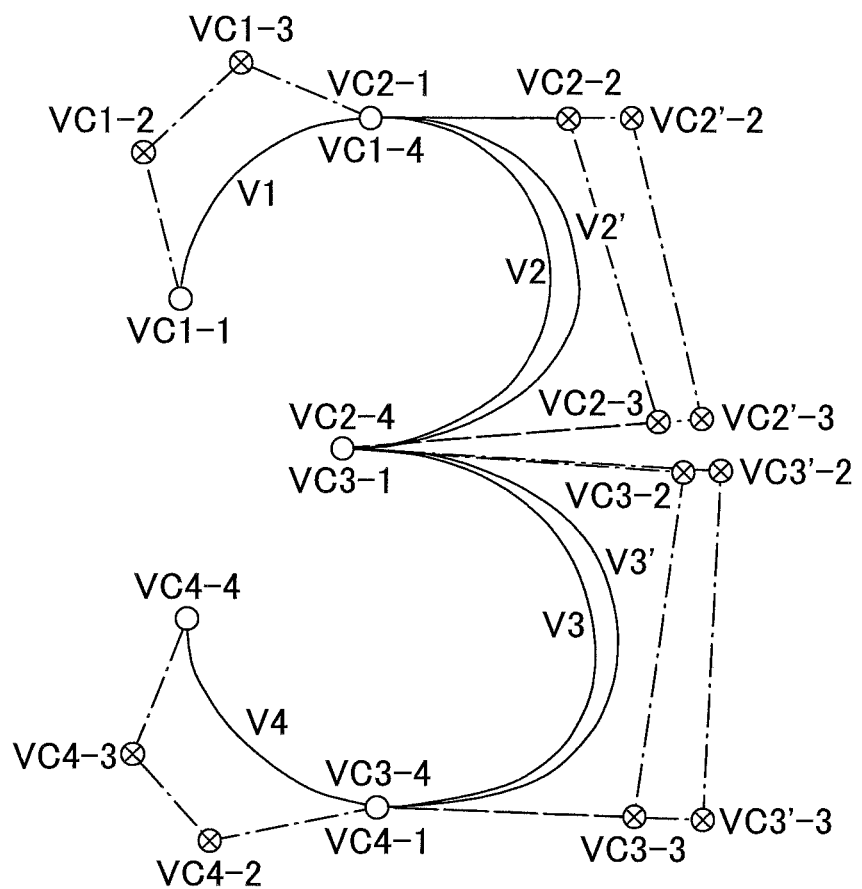

FIGS. 4A and 4B are illustrations of an example of vectors constituting an outline font. In FIGS. 4A and 4B, for the sake of convenience, vectors passing through a center part of a character are illustrated instead of vectors corresponding to the contour of the character. Although FIGS. 4A and 4B illustrate cases where a three-dimensional Bezier curve is used, other curves such as a B spline line can be used. In such a case, a control method is the same as that of the case using a Bezier curve.

FIG. 4A is an illustration of a character "3" (character code in hexadecimal notation: "33"). In FIG. 4A, the character is divided into four vectors V1, V2, V3 and V4, and each of the vectors V1, V2, V3 and V4 is expressed by four coordinate points including a start point, an end point, a control point #1 and a control point #2. With respect to the vector V1, the start point is VC1-1, the end point is VC1-4, and the control points are VC1-2 and VC1-3. With respect to the vector V2, the start point is VC2-1 (=VC1-4), the end point is VC2-4, and the control points are VC2-2 and VC2-3. With respect to the vector V3, the start point is VC3-1 (=VC2-4), the end point is VC3-4, and the control points are VC3-2 and VC3-3. With respect to the vector V4, the start point is VC4-1 (=VC3-4), the end point is VC4-4, and the control points are VC4-2 and VC4-3.

FIG. 4B illustrates a deformed example of the character of FIG. 4A. In the example of FIG. 4B, the character is deformed by moving the control points by moving the vectors V2 and V3 to vectors V2' and V3', respectively. Using the vectors V2' and V3', when developing the character "3", the following options are available.

$$V1 \rightarrow V2 \rightarrow V3 \rightarrow V4 \quad (1)$$

$$V1 \rightarrow V2' \rightarrow V3 \rightarrow V4 \quad (2)$$

$$V1 \rightarrow V2 \rightarrow V3' \rightarrow V4 \quad (3)$$

$$V1 \rightarrow V2' \rightarrow V3' \rightarrow V4 \quad (4)$$

That is, it is possible to embed four kinds (2 bits) of information.

The contents of the character code "33" in the font dictionary 171 of FIG. 2 and the encoding table 172 of FIG. 3 correspond to the vectors illustrated in FIG. 4B. That is, the vectors corresponding to the character code "33", which is the font name "xxx" of the font dictionary 171 of FIG. 2, are the vectors V1, V2, V2', V3, V3' and V4, and the "start point", the "control point #1", the "control point #2" and the "end point" are a start point, two control points and an end point of each of the vectors.

The "amount of information" corresponding to the character code "33" of the font name "xxx" in the code table 172 of FIG. 3 is "2 bits" because there are four combinations of vectors as explained with reference to FIG. 4B. Accordingly, the "code" is set to "00", "01", "10" or "11" in the 2-bit expression. The "use vector" is set to the four kinds of combination of the vectors as explained with reference to FIG. 4B according to the "code".

Figure 5A:
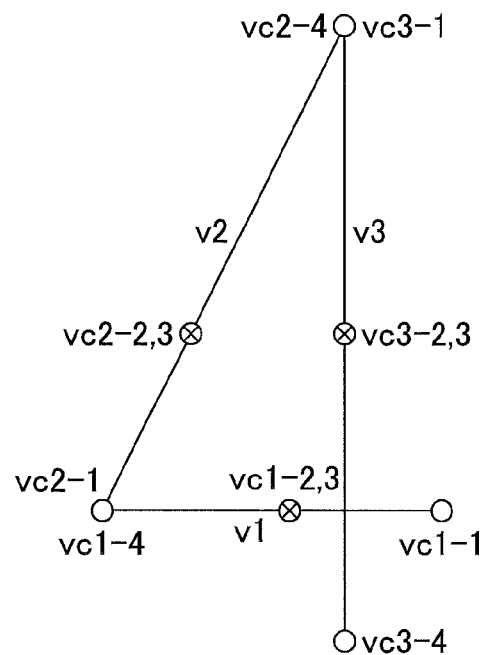
FIGS. 5A and 5B are illustrations of another example of vectors constituting an outline font.
Figure 5B:
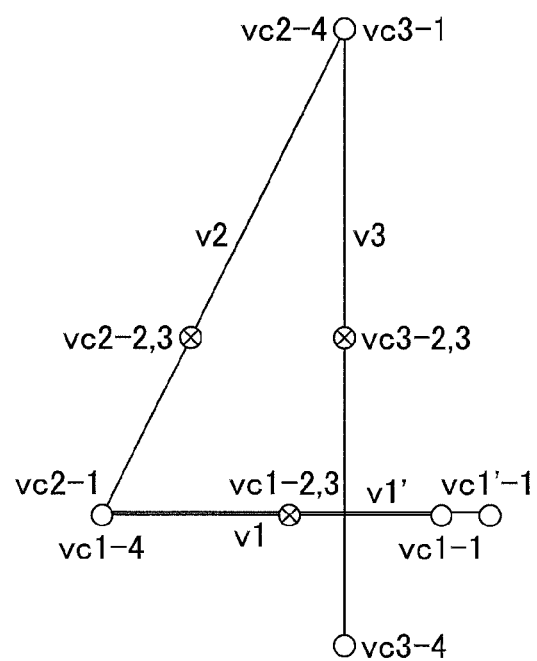

FIGS. 5A and 5B are illustrations of another example of vectors constituting an outline font.

FIG. 5A is an example with respect to the character "4" (character code in the hexadecimal notation: "34"). In FIG. 5A, the character is divided into three vectors v1, v2 and v3, and each of the vectors v1, v2 and v3 is expressed by four coordinate points including a start point, an end point, a control point #1 and a control point #2. With respect to the vector v1, the start point is vc1-1, the end point is vc-4, and the control points are vc1-2 and vc1-3. With respect to the vector v2, the start point is vc2-1 (=vc1-4), the end point is vc2-4, and the control points are vc2-2 and vc2-3. With respect to the vector v3, the start point is vc3-1 (=vc2-4), the end point is vc3-4, and the control points are vc3-2 and vc3-3.

FIG. 5B illustrates a deformed example of the character of FIG. 5A. In the example of FIG. 5B, the character is deformed by moving the vector v1 to v1' by moving the start point vc1-1 to vc1'-. Using the vector v1', when developing the character "4", the following options are available.

$$v1 \rightarrow v2 \rightarrow v3 \quad (1)$$

$$v1' \rightarrow v2 \rightarrow v3 \quad (2)$$

That is, it is possible to embed two kinds (1 bit) of information.

The contents of the character code "34" in the font dictionary 171 of FIG. 2 and the encoding table 172 of FIG. 3 correspond to the vectors illustrated in FIG. 5B. That is, the vectors corresponding to the character code "34", which is the font name "xxx" of the font dictionary 171 of FIG. 2, are the vectors v1, v1', v2 and v3, and the "start point", the "control point #1", the "control point #2" and the "end point" are a start point, two control points and an end point of each of the vectors.

The "amount of information" corresponding to the character code "34" of the font name "xxx" in the code table 172 of FIG. 3 is "1 bit" because there are two combinations of vectors as explained with reference to FIG. 5B. Accordingly, the "code" is set to "00" and "01" in the 1-bit expression. The "use vector" is set to the two kinds of combination of the vectors as explained with reference to FIG. 5B according to the "code".

Because it is not known as to which character can be embedded, normally, a number of sizes of the encode table 172 is necessarily equal to a number of characters. However, the characters used in drawings are limited to numerals and alphabetical characters in many cases. Thus, if the characters into which information can be embedded are limited previously, it is sufficient to produce a number of the encode tables 172 corresponding to the number of sizes of the characters. Of course, the size of the font dictionary 171 can be made small.

A description will now be given of an operation of embedding information in a document. FIG. 6 is a flowchart of a process of printing a document including a process of embedding information in the document.

In FIG. 6, the process is started by a user producing a document containing a drawing or the like by using the picture drawing application 174 and instructing a print start (step S101). According to the print start instruction, the printer driver 173 is booted (step S102), and the user is prompted to make various settings for printing on the display 15.

Simultaneously, the printer driver 173 refers to an amount of information, which can be embedded in a character contained in the document to be printed and to be developed when printing, from a code of the character concerned set in the encode table 172 (step S103), and calculates and acquires an amount of information, which can be embedded in the entire document to be printed (step S104). For example, if there are five characters of which character code is "33" and kind of font is "xxx" and two characters of which character code is "34" and kind of font is "xxx", the amount of information which can be embedded in the document can be calculated as follows.

{2(bits)×5(characters)}+{1(bit)×2(characters)}=12 bits.

Then, the printer driver 173 acquires additional information to be embedded (step S105).

Figure 7:
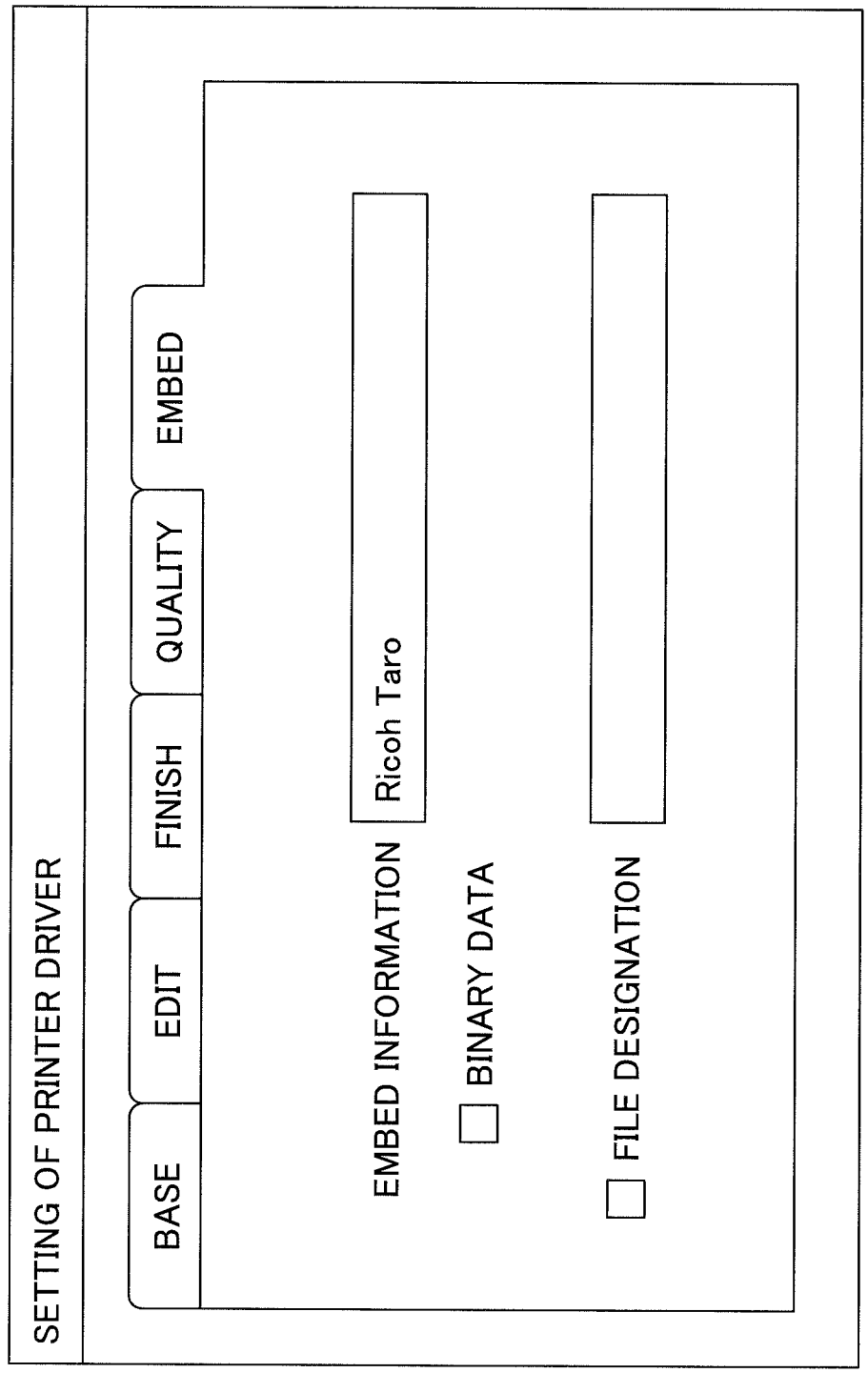
FIG. 7 is an illustration of a setting screen of a printer driver to acquire additional information to be embedded by designating it through the setting screen.

FIG. 7 is an illustration of a setting screen of the printer driver 173 to acquire additional information to be embedded by designating it through the setting screen. Tabs displayed in the setting screen include a tab regarding embedding information (embed tab). The user can input information to be embedded (embed information) through the setting screen, which is displayed when the embed tub is selected. In this example, text is input in a default state. However, if it is desirable to input binary data, a numeral in a hexadecimal notation can be input by checking the item of binary data. Additionally, if it is desirable to designate the information to be embedded by a file designation, a file path is designated by checking an item of file designation.

Figure 8A:
FIG. 8A is an illustration of an example of a format to encode the additional information.
Figure 8B:
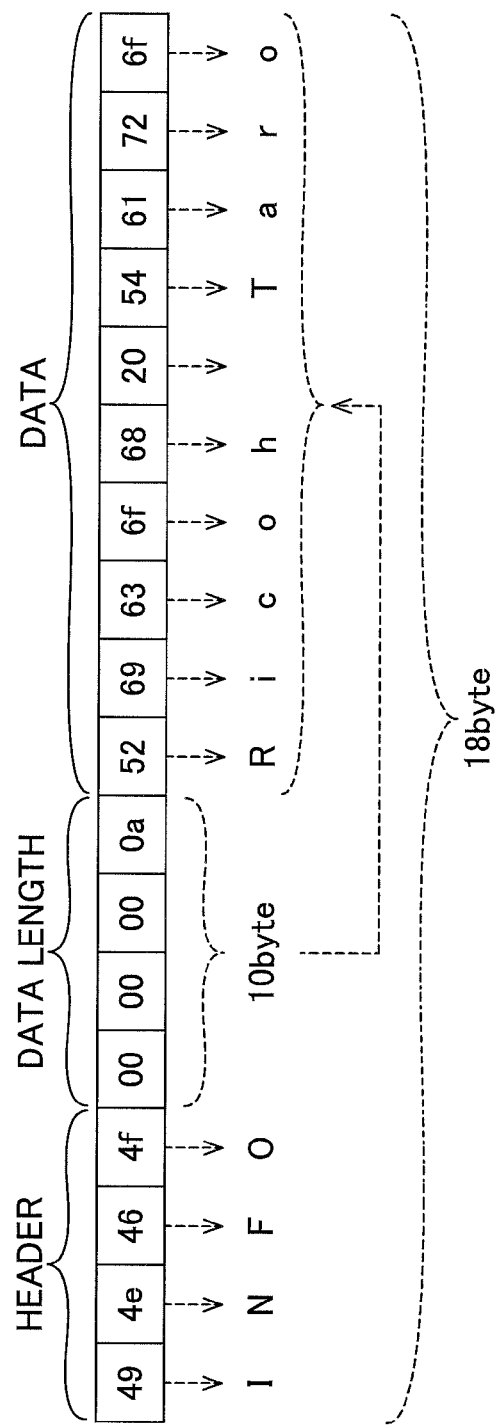
FIG. 8B is an illustration of a result of encoding the additional information illustrated in FIG. 8A.

Returning to FIG. 6, the printer driver 173 encodes the acquired additional information (step S106). FIG. 8A illustrates an example of a format to encode the additional information. In FIG. 8A, a header section has a predetermined length (4 bytes). A data length section corresponds to a length of main data (a number of bytes: 4 bytes). A data section corresponds to the main data. For example, when encoding the text "Ricoh Taro" according to the format illustrated in FIG. 8A, a result is obtained as illustrated in FIG. 8B. Here, the header section is set to "INFO" ("49, 4e, 46, 4f" in the hexadecimal notation). The data length section has the length of the text "Ricoh Taro", which is 10 bytes. The data section is a character code "52, 63, 6f, 68, 20, 54, 61, 7, 6f", which corresponds to the text "Ricoh Taro". The amount of information of the additional information is a sum of the lengths of the header section, the data length and the data section, and is equal to 18 bytes.

Returning to FIG. 6, the printer driver 173 determines whether the amount of information of the encoded additional information can be embedded by comparing the amount of information with the previously calculated amount of information which can be embedded (step S107). If the amount of information of the encoded additional information is larger, the additional information cannot be embedded, and, thus, the user is prompted to input additional information again (step S105). If a manager has set to do so, the additional information may be truncated automatically to an amount of information which can be embedded, or the embedding process may be ended as an error occurrence.

If the amount of information of the encoded additional information is smaller than the amount of information which can be embedded, the printer driver 173 calculates and determines whether an error correction code can be added. If the error correction code can be added, the error correction code is added to the additional information and is encoded (step S108). The error correction code can be obtained using a well-known technique.

Then, the printer driver 173 applies rendering on a part of an image (including characters treated as an image) contained in the document to be printed (step S109).

Then, the printer driver 173 refers to the encode table 172 with respect to the characters contained in the document to be printed (step S110). Thereafter, the printer driver 173 acquires font data from the font dictionary 171 (step S11). Then, the printer driver 173 develops (renders) the font data to a character image (step S112).

For example, when embedding encoded information "101" into the character string "34" (character codes "33" and "34") of the document, a code "10" from the encoded table 172 illustrated in FIG. 3 is embedded into the character "3" of the character code "33" and also a code "1" is embedded into the character "4" of the character code "34". That is, the character "3" is developed using the vectors V1→V2→V3'→V4, and the character "4" is developed using the vectors v1'→v2→v3.

After completing the development, the printer driver 173 sends print data to the printer 3 to have the printer 3 to print out the document (step S113), and ends the process (step S114).

The thus-printed document contains a drawing having a character part such as a size numeral into which information is embedded. Thus, the embedded information can be restored by reading the image of the document by a scanner, analyzing the character form by referring to the font dictionary 171 and the encode table 172, and specifying the combination of vectors constituting the character.

Although the image processing apparatus 1 incorporates therein a main function of embedding information in the above-mentioned embodiment, the function of embedding information may be provided to a printer server as another embodiment. That is, a manager may previously set a printer server to designate a predetermined character or to embed a user ID of a user who requests printing or a print date. When printing, the printer server automatically acquires the user ID or the print date, and uses the acquired data as additional information to be embedded. Other operations are the same as the operation of the above-mentioned embodiment.

As explained above, according to the present embodiment, there are the following advantages.

First, a process of embedding information can be performed without changing geometrical characteristics of drawings or the like contained in a document because additional information is acquired from an external part and, when developing the document into an image, additional information is embedded in a character contained in the document by developing the character while changing the shape of the character according the additional information. That is, the process of embedding information is performed with respect to numerical characters indicating dimensions or characters expressing cautionary statement are contained in the document. Thus, a character as a part of design in drawings or the like is not deformed because such a character has been developed as an image. On the other hand, according to a conventional technique, because a deformation of a character to embed information is performed on a character image after being developed, it is difficult to distinguish numerical characters indicating dimensions or characters expressing cautionary statement from characters as a design.

Additionally, because a plurality of pieces of data of vectors constituting a character or all control points (including a start point and en end point) are retained in a font dictionary so that the control points are used depending on additional information to be embedded. Thus, only a process of selecting font data is added to the process of embedding information, and the process time hardly increases from a process time of a case where the process of embedding information is not performed, which permits a high-speed information embedding process.

As another advantage, a greater amount of information can be embedded because an outline font is used and information is embedded in a character according to a combination of vectors. Although a number of characters must be retained by the kinds of information according to a bit-map font, the outline font permits representation of pieces of information corresponding to a number of combinations of vectors. For example, if two kinds of vector #1 and three kinds of vector #2 of a certain character are retained, six (2×3=6) kinds of information can be represented. In such a case, an amount of font data is much less than six times.

Further, an amount of font data can be reduced by limiting characters to embed information to characters mainly used for drawings (such as, for example, numerals and alphabetical characters).

The present invention is not limited to the specifically disclosed embodiments, and variations and modifications may be made without departing from the scope of the present invention.

The present application is based on Japanese priority application No. 2010-150080 filed on Jun. 30, 2010, the entire contents of which are hereby incorporated herein by reference.

What is claimed is:

1. An image processing apparatus, comprising:
an input part configured to input additional information to be embedded when printing a document;
a developing part configured to develop a character contained in said document, into which character said additional information is to be embedded, using a form deformed according to said additional information; and
a memory storing a font dictionary retaining a plurality of forms of the character,
wherein said developing art selectively uses character according to said additional information by referring to said font dictionary with respect to the character into which said additional information is to be embedded, and
wherein the forms of the character are represented by vectors.

2. The image processing apparatus as claimed in claim 1, wherein a plurality of control points including a start point and an end point are defined in each of the forms of the character so that each of the vectors is defined using the control points.

3. The image processing apparatus as claimed in claim 1, wherein the character into which the additional information is embedded is limited to a predetermined group of characters from among characters to be developed when printing said document.

4. The image forming apparatus as claimed in claim 3, wherein the character into which the additional information is embedded is selected from characters used for drawings.

5. The image forming apparatus as claimed in claim 4, wherein the characters used for drawings are numerals and characters indicating dimensions or cautionary statements in the drawings.

6. An image processing method, comprising:
inputting additional information to be embedded when printing a document;
developing a character contained in said document, into which character said additional information is to be embedded, using a form deformed according to said additional information;
storing a font dictionary retaining a plurality of fauns of the character;
selectively using the forms of the character according to said additional information by referring to said font dictionary with respect to the character into which said additional information is to be embedded; and
representing the forms of the character by vectors.

7. A non-transitory computer readable recording medium storing a program to cause a computer to perform the image processing method as claimed in claim 6.

8. The image processing method as claimed in claim 6, further comprising defining a plurality of control points including a start point and an end point in each of the forms of the character so that each of the vectors is defined using the control points.

9. The image processing method as claimed in claim 6, further comprising limiting the character into which the additional information is embedded to a predetermined group of characters from among characters to be developed when printing said document.

10. The image forming method as claimed in claim 9, further comprising selecting the character into which the additional information is embedded from characters used for drawings.

11. The image forming method as claimed in claim 10, wherein the characters used for drawings are numerals and characters indicating dimensions or cautionary statements in the drawings.

* * * * *